United States Patent [19]
Robbert et al.

[11] Patent Number: 5,669,997
[45] Date of Patent: Sep. 23, 1997

[54] METHOD OF BONDING OPTICAL MEMBERS TOGETHER

[75] Inventors: Charles F. Robbert, Newton Center; Steven M. Daigneault, Rockland, both of Mass.

[73] Assignee: Hughes Danbury Optical Systems, Inc., Danbury, Conn.

[21] Appl. No.: 502,160

[22] Filed: Jul. 13, 1995

[51] Int. Cl.$^6$ .................. B32B 17/00; B32B 31/18
[52] U.S. Cl. .......... 156/101; 156/257; 156/272.8; 156/292
[58] Field of Search ............... 156/99, 101, 257, 156/272.8, 292

[56] References Cited

U.S. PATENT DOCUMENTS

| | | | |
|---|---|---|---|
| 2,202,690 | 5/1940 | Fix et al. | 29/462 |
| 2,264,190 | 11/1941 | Sherts et al. | 156/101 X |
| 3,211,601 | 10/1965 | Wand et al. | 156/257 |
| 3,397,102 | 8/1968 | Schraub | 156/257 |
| 4,426,240 | 1/1984 | Louis et al. | 156/99 |
| 4,518,446 | 5/1985 | Drennan | 156/99 X |
| 4,598,039 | 7/1986 | Fischer et al. | 156/272.8 X |
| 4,629,892 | 12/1986 | Carmichael et al. | 250/353 |
| 4,640,729 | 2/1987 | Fujii et al. | 156/257 |
| 4,721,541 | 1/1988 | Hodges | 156/89 |
| 4,841,952 | 6/1989 | Sato et al. | 128/6 |
| 4,857,130 | 8/1989 | Curtis | 156/292 |
| 4,952,263 | 8/1990 | Kakii et al. | 156/153 |
| 5,084,123 | 1/1992 | Curtis | 156/292 |
| 5,199,966 | 4/1993 | Harvey et al. | 156/158 X |
| 5,369,717 | 11/1994 | Attridge | 385/12 |

OTHER PUBLICATIONS

Memorandum from James D. Phillips et al. (Center for Astrophysics, Harvard College, Smithsonian Astrophysical Observatory) to the Fiducial Block Manufacturing Group, pp. 1–7, Jul. 28, 1993.

*Primary Examiner*—James Sells
*Assistant Examiner*—Paul M. Rivard
*Attorney, Agent, or Firm*—W. C. Schubert; W. K. Denson-Low

[57] ABSTRACT

The present invention involves a method for bonding together molecularly homogeneous objects including optical and semiconductor members. In particular, such method involves forming micro-thin grooves using high precision laser ablation in one of two surfaces to be bonded together. An adhesive is then flowed into such a groove to form chemical bonding of the members. Such bonding essentially eliminates the formation of an adhesive layer in the interface between the bonding surfaces allowing optical contacting in addition to the chemical bonding.

12 Claims, 4 Drawing Sheets

METHOD OF BONDING OPTICAL MEMBERS TOGETHER

BACKGROUND OF THE INVENTION

Precision bonding is often one of the most critical aspects of high performance instruments where the intervening bond layer is required to have little or no contributing effect towards degrading or altering the homogeneity of the materials being joined together. In particular, optical instruments such as prisms and interferometers manufactured by combining multiple optical elements require bonding techniques that do not compromise or distort optical properties of the combined members as a single operative unit. In addition, these instruments are typically expected to meet highly stressing conditions such as encountered in a space launch application.

To accommodate such needs, engineers and scientists have frequently considered techniques such as "optical contacting" or "frit bonding" to combine two pieces of glass. Such techniques aim to minimize or exclude any adverse effects of an intervening bond layer on the performance of the combined optical objects.

The process of optical contacting is to create a condition where air is completely removed in the interface between the glass surfaces. This allows van der Waals molecular forces to hold the surfaces together. However, the strength associated with these forces is not very well known. The available research indicates that the forces are generally weak. For example, van der Waals forces are typically on the order of hundreds of pounds per square inch versus thousands for chemical adhesion.

Apart from its bonding strength, however, optical contacting generally lack robustness in a wide range of stressing conditions. Therefore, it is a process often restricted to applications in optical shops for temporary adhesion of two flat surfaces in contact without regard to azimuth orientation of each part. Optical contacting, therefore, would not be appropriate for use in a prism manufacturing since such process requires prism components to undergo micro-level displacements of angle and azimuth in order to meet required tolerances.

Frit bonding or fritting is an approach commonly used for assembling glass combinations by melting a mixture of frit materials in the interface between two optical surfaces. The primary advantages of such technique are bond strength and the retention of a continuous glass structure. The disadvantage is that it requires heat up to several hundred degrees centigrade. Maintaining such level of heat during bonding tends to create alignment inconsistencies between two optical parts being joined. Hence this technique is also inappropriate for high precision optical instruments where alignment and monitoring the metrology process are strict. Consequently, a need exists for an improved bonding method which is robust in a wide range of conditions without degrading the operative physical properties of the bonding members.

SUMMARY OF THE INVENTION

The present invention is an improved bonding technique generally suited for bonding together any molecularly homogenous materials including optical objects. The bonding method of the present invention overcomes distortion or surface movements caused by curing (chemical shrinkage) and/or thermal expansion of chemical adhesives. Furthermore, the bonding method of the present invention overcomes uncertainties and robustness problems typically associated with non-adhesive bonding methods such as optical contacting.

In a preferred embodiment of the present invention, two optical members are bonded essentially without an intervening adhesive layer to promote a glass-to-glass registration. Such bonding is achieved by laser-ablating a thin groove in one of the contact surfaces for holding a flat line of adhesive therein. The surfaces of the optical members are initially bonded by means of optical contacting. This is followed by a chemical bonding process which involves "wicking" a low viscosity adhesive into an open end of the cavity such that the line of adhesive flowed therein holds the two members by forming a chemical bonding of the two surfaces. In this particular embodiment, the adhesive is particularly chosen to have the necessary strength and viscosity characteristics. Additionally, such adhesive should have negligible shrinkage or expansion properties during cure or operation under heat.

A bonding method according to the present invention combines strength and thermal stability of chemical bonding with the transparency of optical contacting. In the preferred embodiment, the optical contacting is formed by allowing glass-to-glass registration essentially without introducing an intervening layer of adhesive between the bonding surfaces. The area required for forming the cavity is negligible as compared to the overall bonding surface and is set outside the primary optical path such that the area forming the adhesive bonding is nearly invisible to the optical operation of the combined members.

The above and other features of the invention including various novel details of construction and combinations of parts will now be more particularly described with reference to the accompanying drawings and pointed out in the claims. It will be understood that the particular method of bonding embodying the invention is shown by way of illustration only and not as a limitation of the invention. The principles and features of this invention may be employed in varied and numerous embodiments without departing from the scope of the invention.

DETAILED DESCRIPTION OF THE INVENTION

The present invention is directed to a method of bonding together any molecularly homogeneous objects including optical and semiconductor elements. The resulting bonded structure is essentially free of any material distortion in connection with cure-shrinkage or thermal expansion of the adhesive layer. The bonding method according to the present invention is especially effective for combining optical members which require retention of precise and uniform optical properties between joined members. Additionally, the bonding method of the present invention incorporates chemical bonding to insure robustness in stressing operating conditions such as space launch applications.

Figure 1:
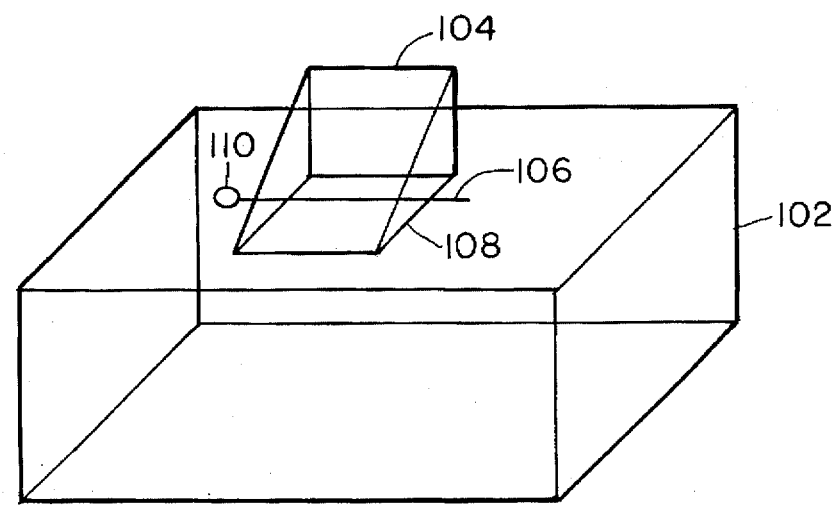
FIG. 1 illustrates two members bonded in accordance with the method of the present invention.

Referring now to drawings, FIG. 1 is a general illustration of two optical members bonded in accordance with the method of the present invention. Shown in this particular embodiment is a combination of optical members consisting of a base member 102 and a mounting member 104. The base member includes a micro-thin groove 106 formed by a laser ablation ion beam etching or plasma-beam etching. The two surfaces of the members forming a contact interface 108 are optically polished prior to being bonded together. The two members are then initially bonded by means of optical contacting which is achieved by directly registering the two polished optical surfaces to each other. An adhesive is then wicked into an open end 110 of the micro-thin gap. Here the process of wicking represents flowing a liquid adhesive by way of capillary action (i.e., natural attraction between liquid and solid) into a solid gap or cavity, such as the one described above. As the adhesive sets, chemical bonding between the two optical members is formed in addition to optical contacting. The various steps involved in this bonding method are more particularly described in the following figures.

Figure 2A:
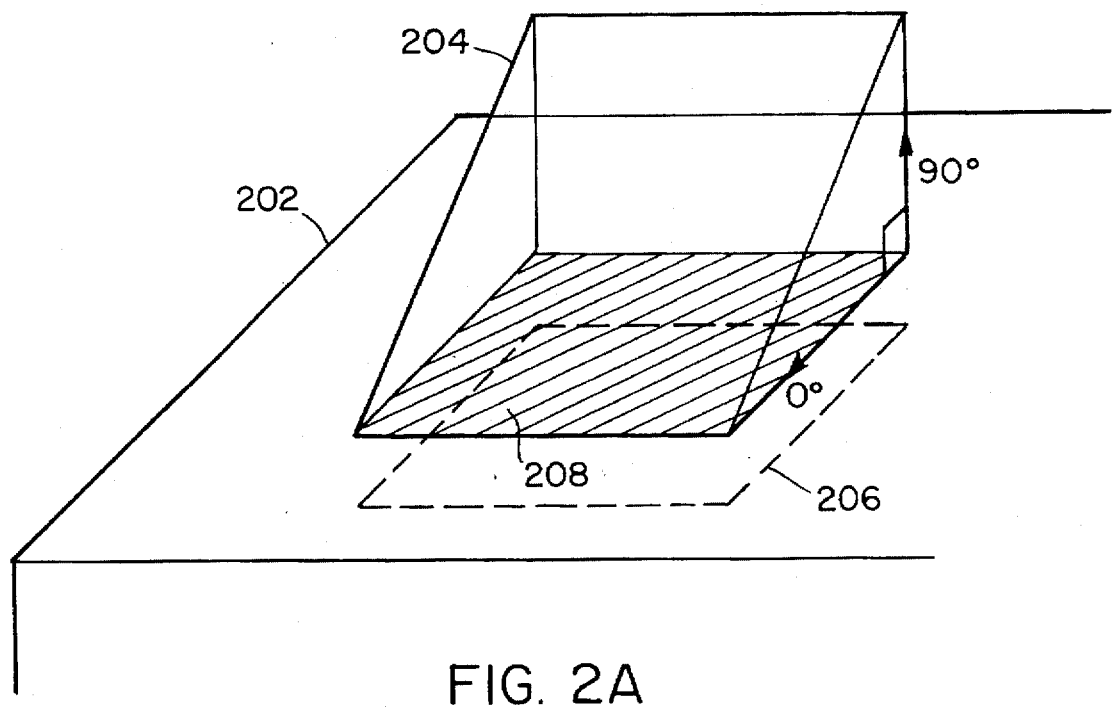
FIG. 2A illustrates the process of bonding two members having flat optically polished mounting surfaces of prescribed precision.

In FIG. 2A, the bonding objects are again two optical members consisting of a mounting member 204 and a base member 202 (shown in part). Prior to bonding the members together, a mounting surface 208 and a registration surface 206 of the two members are optically polished such that when these two surfaces make contact, the optical properties of the members are uniformly maintained throughout the combined structure as a whole.

Figure 2B:
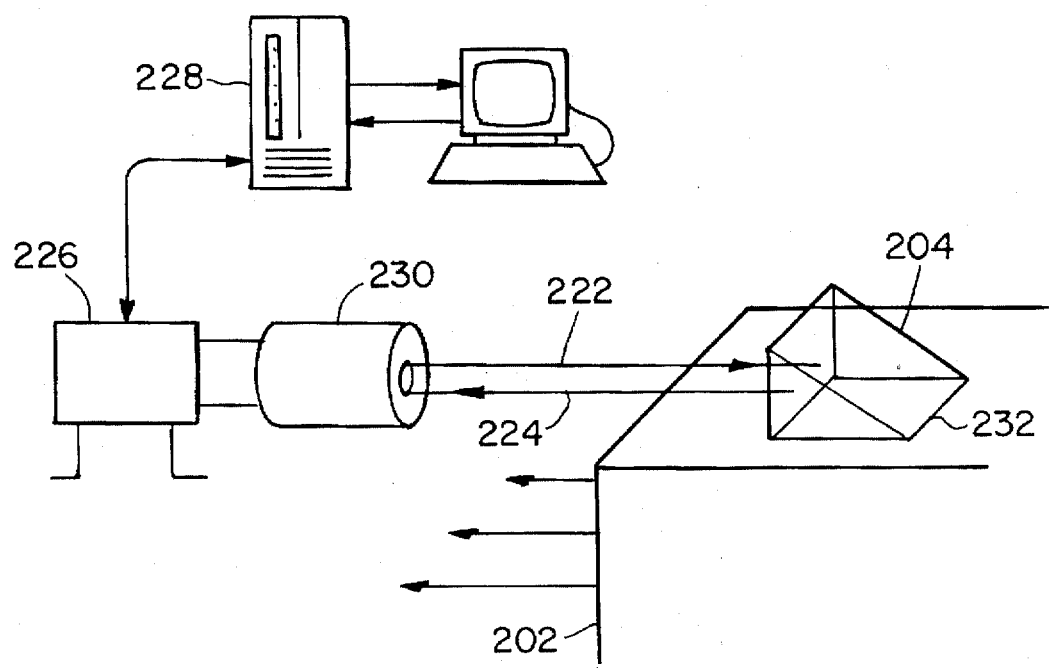
FIG. 2B is an apparatus used for determining tilt error of two combined members.

Additionally, the polished surface should form smooth flat surface to the extent that the two members are stacked without a significant tilt in either the vertical or horizontal reference plane. In a particular embodiment, as shown in FIG. 2B, a highly directional collimated beam 222 equal to or larger than 1 centimeter in aperture is transmitted by a laser source 230 onto the optically polished interface 232 between the above-described optical members 204 and 202. (See FIG. 2A.) A signal transducer 226 receives a return laser beam 224 from each surface and sends data containing the precision bearings of the two optical members to a computer system 228. Based on this information, the computer system determines tilt in the combined structure, if any, due to polishing irregularities. The resulting tilt value is quantified by a vector, arc-second (arc sec), having a horizontal (tilt-x) and vertical (tilt-y) components. In a particular embodiment involving precision optical members, for example, it is required that bonded members are polished within 6 arc sec of tilt between the two surfaces.

Figure 3:
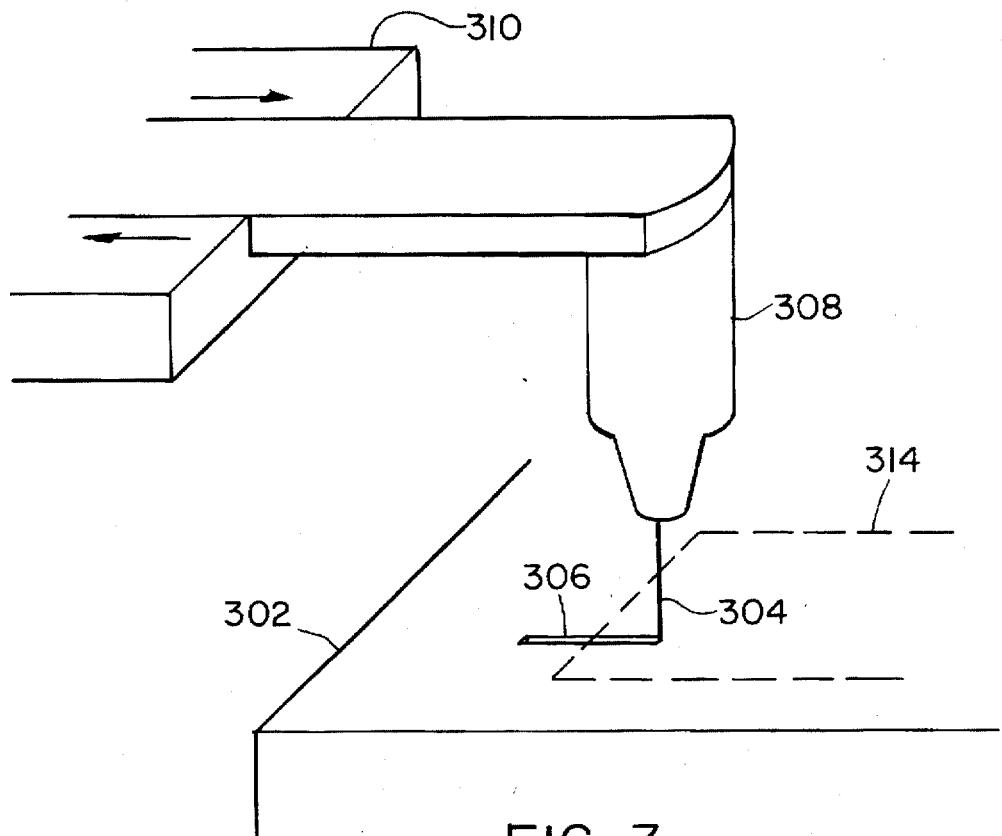
FIG. 3 illustrates the process of forming a predefined groove by a precision laser ablation.

FIG. 3 illustrates the process of forming a micro-thin groove 306 on a base member 302 using a laser 304 in accordance with the method of the present invention. In this example, a laser source 308 is coupled to a control track 310 which linearly moves the laser arm 312 at a uniform speed for a predefined length. The laser in this example is tuned to a wavelength of 248 nm at an operating frequency of 115 Hz and a power density of 18 J/cm$^2$. As the laser arm slides across the top surface of the base member, a groove 306 of uniform dimensions is produced across the surface of the base member. Note that a portion 314 of the surface on the base member is an optically polished region.

Figure 4A:
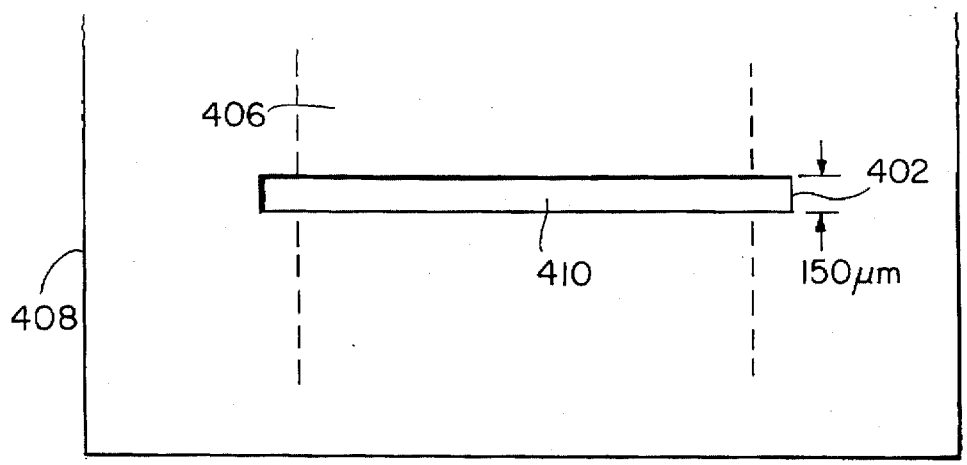
FIGS. 4A–4C illustrate a base member having a groove of precise dimensions formed by the laser ablation technique as shown in FIG. 3.
Figure 4B:
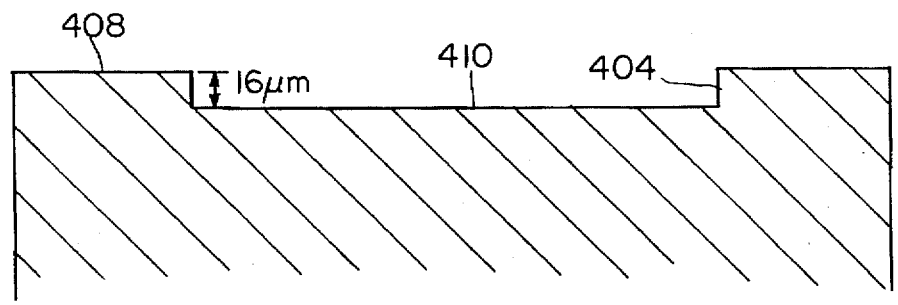
Figure 4C:
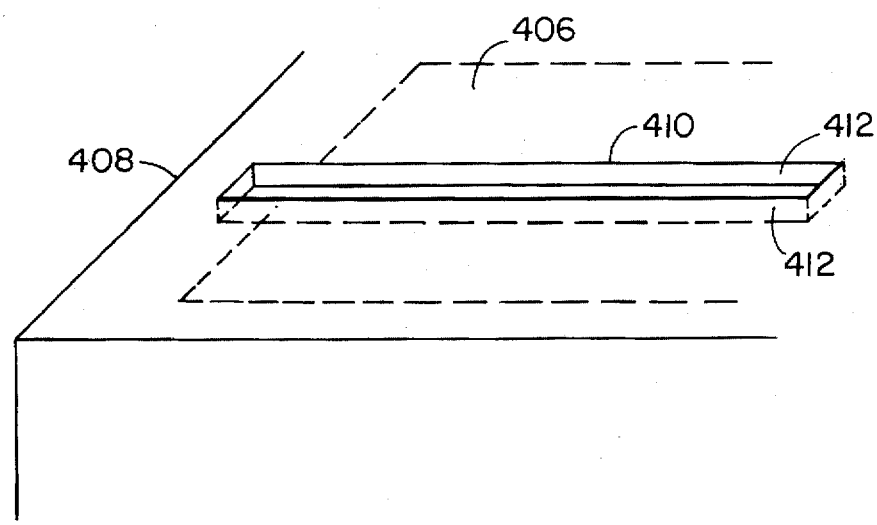

FIGS. 4A–4C show enlarged views of a completed laser-ablated groove 410. The groove in this figure has uniform dimensions of 50–250 microns in width and 5–20 microns in depth. Such controlled ablation as described in produces well defined groove sides 412 and causes no measurable deformation in the polished surface 406.

Figure 5:
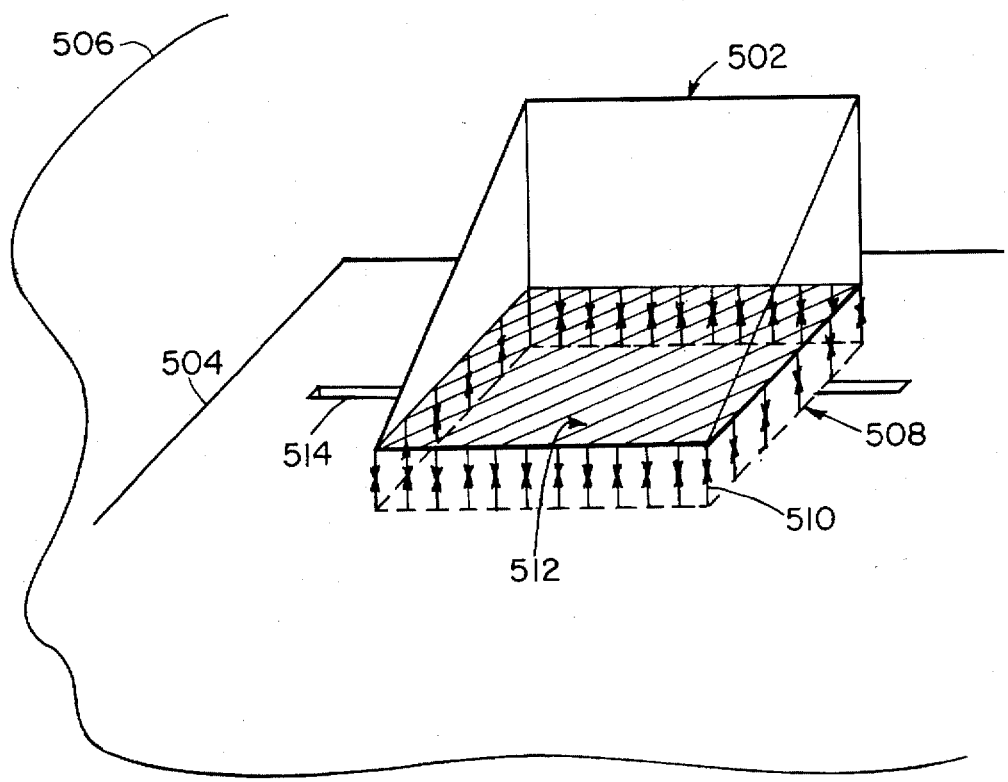
FIG. 5 illustrates the process of forming optical contact between a base member having a laser ablated groove and a mounting member.

FIG. 5 illustrates an optical contacting process according to the method of the present invention between an optical base member 504 having a laser ablated groove 514 and an optical mounting member 502. A mounting surface 512 and a registration surface 508 have been optically polished according to the method of the present invention and as described above. Note also that the groove, as formed according to the method of present invention, runs across the entire width of the polished registration surface leaving both ends open. The process of optical contacting is performed by pressing the two contacting surfaces together allowing van der Waals molecular forces, as represented by merging arrows 510, to hold the surfaces together.

Figure 6:
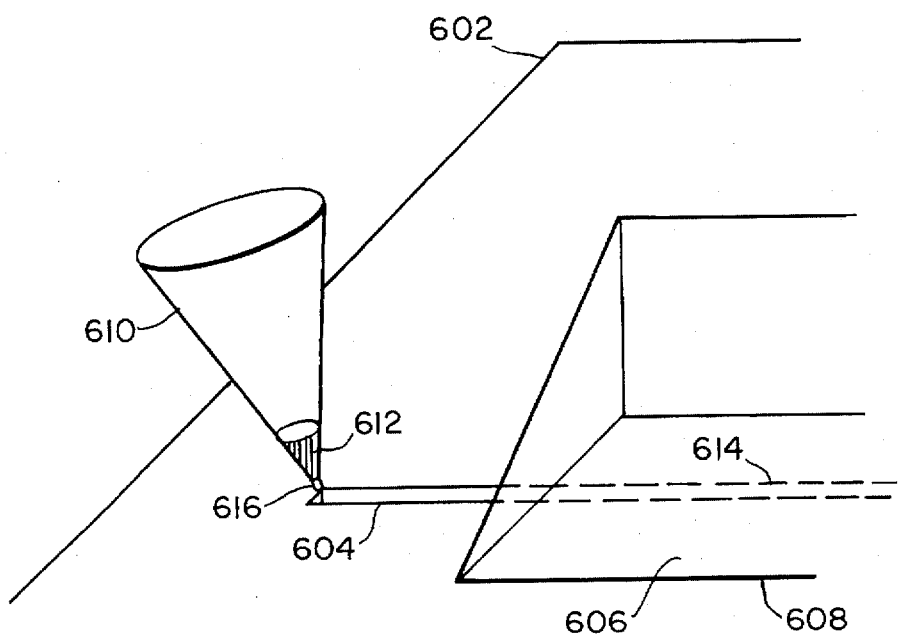
FIG. 6 illustrates the process of wicking an adhesive of suitable characteristic and strength into the open end of a laser ablated groove.

FIG. 6 illustrates the process of wicking an adhesive 612 into an open end 604 of a laser ablated groove. The process of wicking takes place following a weak initial bond formed by optical contacting at the interface 608 between an optical mounting member 606 and an optical base member 602. As shown in FIG. 6, a micro-tip 616 at a distal end of a delivery mechanism 610 makes contact with an open end of the groove and allows a low viscosity liquid adhesive 612 to flow into the groove. By a capillary action, the liquid adhesive is drawn into the entire length of the groove. As the adhesive sets, a chemical bonding is formed along the adhesive track 614 joining the two members together.

The adhesive used in such method as described in FIG. 6 is particularly chosen to accommodate a wicking process into a micro-gap in accordance with the method of the present invention. Additionally, it is preferred that the adhesive cures at room temperature with adequate strength, without requiring any extraneous treating means such as heating or ultra-violet radiation, either of which may impact the physical properties and/or alignment of the bonding members. It is also preferred that the adhesive cures with controlled shrinkage thereby producing little or no post-cure thermal strain. In a typical application involving precision optical members, a movement of less than 0.4 picometer is desired or a post cure thermal expansion of less than 0.4 picometers.

Equivalents

While the invention has been described in connection with specific methods and apparatus, it is to be understood that the description is by way of example and not as a limitation to the scope of the invention as set forth in the claims.

We claim:

1. A method of bonding two optical members together while minimizing optical distortion during bonding comprising:

forming a mounting surface on a first member and a registration surface on a second member;

forming a groove in the registration surface of uniform depth with defined groove sides and groove ends;

mounting the first member on the second member such that the mounting surface makes contact with the registration surface and is retained by molecular forces and covers the groove leaving an end of the groove exposed; and filling the groove with an optically transparent adhesive by contacting the exposed end of the groove with the adhesive and allowing the adhesive to flow into the groove by capillary action, whereby, as the adhesive sets, the members are bonded together to function as a single operative unit.

2. The method of claim 1, wherein the step of forming a groove includes ablation by a laser, ion-beam etching, or plasma-beam etching.

3. The method of claim 1, wherein the mounting and the base members are homogenous semiconductor materials selected from the group consisting of silicon, gallium arsenide, glass and sapphire.

4. A method of bonding two or more optical members together comprising:

optically polishing surfaces of a first and a second optical members, so that, when the two polished surfaces of the optical members are joined at a 90° angle, they are within a few arc-seconds of each other;

forming a groove across the flat surface of the second optical member by a laser ablation;

forming an optical contact between the two flat surfaces in which the surfaces are held together by molecular forces leaving an end of the groove exposed; and bonding the two flat surfaces together to function as a single operative unit by filling the groove with an optically clear adhesive by contacting an exposed end of the groove with the adhesive and allowing the adhesive to flow into the groove by capillary action and set.

5. The method of claim 4 further comprising:

forming the groove by a laser beam having a wavelength in the range of 200 to 300 nm and an operating frequency of about 115 Hertz and a power density of at least 18 J/cm$^2$;

scanning the laser at constant speed over one of the flat surfaces to ablate material; and controlling the laser so that the groove is formed with a uniform depth of no more than 20 microns with precisely defined groove sides.

6. The method of claim 4, whereby the process of optical contacting comprises removing the air in the interface between the mounting surface and the registration surface to allow van der Waals molecular forces to hold the surfaces together until the adhesive sets.

7. The method of claim 4 further comprising mounting the first optical member on the second optical member using an auto collimator to position the two surfaces with no more than 6 arc-seconds of tilt error between the surfaces.

8. The method of claim 4, wherein the properties of the adhesive include: room temperature curing; low viscosity for wicking into bond gaps as narrow as 150 microns and 15 microns deep; post-cure thermal expansion of less than 0.4 picometer; and cure stress of 219 psi or less.

9. The method of claim 4 in which the adhesive cures at room temperature with negligible expansion.

10. The method of claim 1 in which the adhesive cures at room temperature with negligible expansion.

11. The method of claim 9 wherein the expansion is less than 0.4 picometers.

12. The method of claim 10 wherein the expansion is less than 0.4 picometers.

* * * * *